United States Patent [19]

Umezawa et al.

[11] Patent Number: 5,199,171

[45] Date of Patent: Apr. 6, 1993

[54] METHOD OF MANUFACTURING A MOTOR CASING MADE OF RESIN

[75] Inventors: Takao Umezawa, Seta; Takao Ochiai, Ashikaga, both of Japan

[73] Assignee: Mitsuba Electric Manufacturing Co., Ltd., Gumna, Japan

[21] Appl. No.: 921,965

[22] Filed: Aug. 4, 1992

Related U.S. Application Data

[63] Continuation of Ser. No. 708,706, May 31, 1991, abandoned.

[30] Foreign Application Priority Data

May 31, 1990 [JP] Japan ................... 2-142679
Jun. 15, 1990 [JP] Japan ................... 2-157283
Jun. 15, 1990 [JP] Japan ................... 2-157284

[51] Int. Cl.$^5$ ............................................. B21D 53/00
[52] U.S. Cl. ............................. 29/898.07; 29/447; 29/527.1; 264/229; 264/249
[58] Field of Search ........... 29/898.07, 898.12, 447, 29/458, 527.1, DIG. 29; 264/229, 230, 249, DIG. 71, 272.19, 272.2, 336

[56] References Cited

U.S. PATENT DOCUMENTS

| | | | |
|---|---|---|---|
| 1,981,334 | 11/1934 | Schmalz | 264/230 X |
| 2,027,962 | 1/1936 | Currie | 264/230 |
| 3,002,261 | 10/1961 | Avila et al. | 29/DIG. 29 X |
| 3,577,496 | 5/1971 | Hoffman | 264/249 X |
| 3,577,850 | 5/1971 | Harris, Sr. | 264/249 X |
| 3,663,678 | 5/1972 | Miller | 264/230 |
| 4,065,190 | 12/1977 | Hallerback | 29/898.07 X |
| 4,754,537 | 7/1988 | Lee | 29/447 X |
| 4,908,922 | 3/1990 | Abe | 29/898.12 X |

*Primary Examiner*—Joseph M. Gorski
*Assistant Examiner*—S. Thomas Hughes
*Attorney, Agent, or Firm*—Oliff & Berridge

[57] ABSTRACT

Disclosed are a motor casing made of a resin and a method of manufacturing such a motor casing. A bearing for rotatably supporting a core shaft of a rotor core is inserted into a bearing seat portion of the motor casing when the temperature of the resin material which forms the bearing seat portion is substantially at the glass transition temperature thereof or above, the resin material being cooled to a room temperature.

6 Claims, 6 Drawing Sheets at lower temperature at room temperature

PRIOR ART

METHOD OF MANUFACTURING A MOTOR CASING MADE OF RESIN

This is a continuation of application Ser. No. 07/708,706 filed May 31, 1991, now abandoned.

BACKGROUND OF THE INVENTION

1. Field of the Invention

The present invention relates to a motor casing made of a resin, for use in vehicle-mounted electric equipment or the like, and a method of manufacturing the same.

2. Description of the Related Art

It has been proposed to form a light-weight motor casing (a motor housing) by molding using a crystallizable thermoplastic resin material. However, a motor casing made of thermoplastic resin suffers from a drawback in that the processing accuracy is lower than that of a metal casing. Therefore, in such a resin motor casing, the portion into which a bearing for rotatably supporting a motor shaft is pressingly inserted has an inner peripheral surface which is not round. This allows an excessive amount of localized pressure to act on the bearing, causing localized deformations and reduction in the bearing accuracy.

Furthermore, as shown in FIG. 5, a bearing 6 is inserted into a bearing seat 11a of a bearing seat portion 11 of a casing 10 made of a resin where the bearing seat 11a has an inner diameter smaller than the outer diameter of the bearing 6. With such a casing, the inner diameter of the bearing seat may be increased to such an extent that a required bearing seating pressure cannot be obtained due to the deteriorated processing accuracy. In that case, the bearing may shift out of the bearing seat 11a.

Motors mounted on a vehicle, such as an automobile, are well-known. In a motor casing for use in a vehicle motor, the operational temperature range in which the motor casing is used must be enlarged to include the high temperature end. However, since the coefficient of thermal expansion of the resin material which forms the motor casing is larger than that of the metal which forms the bearing, the inner diameter of the bearing seat 11a may become larger than the outer diameter of the bearing at high operational temperatures. A combination of this expansion, and creeping of the resin material, leads to reduction in the seating pressure on the bearing, thus allowing the bearing to shift from the bearing seat portion.

It has therefore been proposed to reduce the inner diameter of the bearing seat to ensure the required seating pressure at high operational temperatures. However, this makes the seating pressure too large in a normal temperature state, generating galling between the inner peripheral surface of the bearing seat and the outer surface of the bearing, which may lead to planing of the inner peripheral surface of the bearing seat portion or to the cracking of the bearing seat.

In the above-described type of motor casing, a reinforcing material, such as glass fiber, may be mixed in, in order to increase the mechanical strength of the casing. As the reinforcing material has a fiber-like shape and is elongated, an ejected resin material may have a directional property, and have different shrinkage factors in the longitudinal and lateral directions. This increases the tendency for dimensional changes of the motor casing.

Accordingly, attempts have been made to improve the accuracy of the resin casing by maintaining the temperature of the mold used for molding at substantially the recrystallization temperature of the resin material over many hours until the crystallization of the resin material reaches substantially a saturated state, the resin being then cooled. This is effective to restrict changes (shrinkages) in the dimensions caused by the recrystallization of the resin product. However, to obtain a saturated state of crystallization, the temperature must be held constant over many hours. This is unpractical as the most economical manufacturing method is to make casings which are mass produced in a short period of time.

In another conventional manufacturing method, a resin material is injected into a mold which is heated to a lower temperature so as to achieve quick cooling of the resin material and thereby shorten the molding time. However, in this method, amorphous areas may be generated in the resin material due to quick cooling. Such amorphous areas may recrystallize when the casing is used in the vicinity of the glass transition temperature, thus generating changes in the dimensions. Such temperatures are generated when the casing is used for electrical equipment mounted on a vehicle.

Accordingly, it has been proposed to prevent generation of amorphous areas by controlling the speed at which the temperature of the mold is lowered by using a temperature adjusting device mounted on the mold. It has also been proposed to use a mold which is slightly elliptical or eccentric, so that changes in the dimensions caused by molding are taken into consideration and compensated for. Deformation caused by molding may therefore make the casing round. However, in this method, the relation between the temperature lowering speed and the changes in the dimensions of the product and the shape of the mold must be measured using a highly accurate measuring technique. Also, since a very sophisticated and expensive temperature lowering device and an accurate mold processing technique are required, large losses in both time and cost are generated. When the shape of the molded product is complicated, as in the present motor casing, estimation of changes in the dimensions caused by molding is difficult. Therefore, consistent reproducibility of corrected, round, casings is poor.

In another manufacturing method, accuracy of the bearing inserting position is improved by increasing the wall thickness of the bearing so that the seating pressure does not cause deformation of the bearing or by reducing the insertion margin between the bearing and the bearing seat. The insertion margin is the overlap or difference caused by a bearing whose outer diameter is slightly larger than the inner diameter of the bearing seat.

In the former method, the diameter of the motor casing increases by a degree at which the bearing is made thicker, thus increasing the overall size of the motor casing. In the latter method, since the inserting margin is small, the bearing shifts quite easily. Consequently, the bearing supporting strength is reduced.

SUMMARY OF THE INVENTION

Accordingly, it is an object of the present invention to provide a motor casing made of a resin and a method of manufacturing such a motor casing which are capable of overcoming the aforementioned problems of conventional motor casings.

To achieve this object, the present invention provides a method of manufacturing a motor casing which is characterized by a motor casing which is formed by injection molding a thermoplastic resin material into a mold, inserting a bearing for rotatably supporting a core shaft of a rotor core into a bearing seat portion of the motor casing before the temperature of the resin material is substantially lowered to the glass transition temperature, then cooling the resin material to room temperature.

The present invention further provides for a motor casing made of a resin, which is characterized by a motor casing which is manufactured by injection molding a thermoplastic resin into a mold, inserting a bearing for rotatably supporting a core shaft of a rotor core into a bearing seat portion of the motor casing before the temperature of the resin material substantially lowers to the glass transition temperature $T_g$, then cooling the resin material to room temperature.

The present invention further provides for a motor casing made of a resin, which comprises a bearing seat portion for rotatably supporting a motor shaft through a bearing, the bearing seat portion having a bearing seat into which the bearing is inserted, and a shift prevention portion having an inner diameter smaller than the outer diameter of the bearing and located on an inlet side of the bearing seat.

The present invention further provides a motor casing made of a resin, which is characterized in that a bearing seat portion thereof for rotatably supporting a motor shaft through a bearing has a bearing seat into which the bearing is inserted, a shift prevention portion having an inner diameter smaller than the outer diameter of the bearing and located on an inlet side of the bearing seat, and a bearing inserting portion located on the inlet side of the shift prevention portion and having a diameter larger than the outer diameter of the bearing.

In the present invention, although the motor casing is made of a resin, the circularity of the bearing seat is greatly improved. Furthermore, shifting of the bearing inserted into the bearing seat formed in the motor casing is prevented.

DETAILED DESCRIPTION OF THE PREFERRED EMBODIMENT

Figure 1:
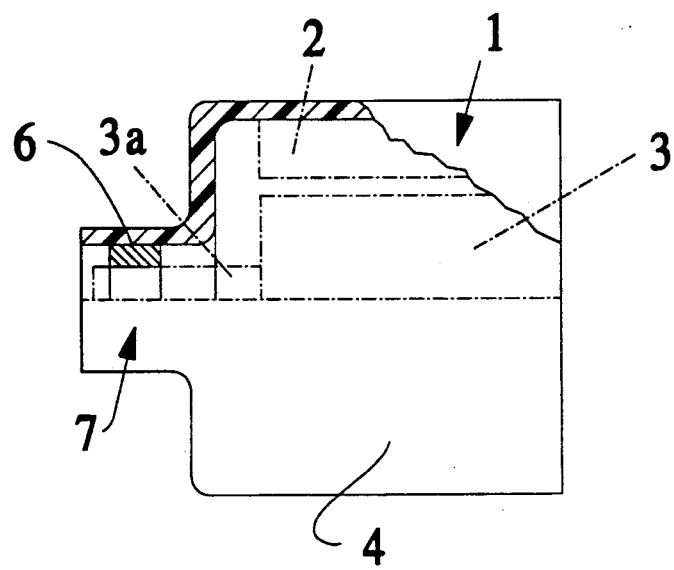
FIG. 1 is a schematic cross-sectional view of a motor, showing an embodiment of a motor casing according to the present invention.
Figure 3:
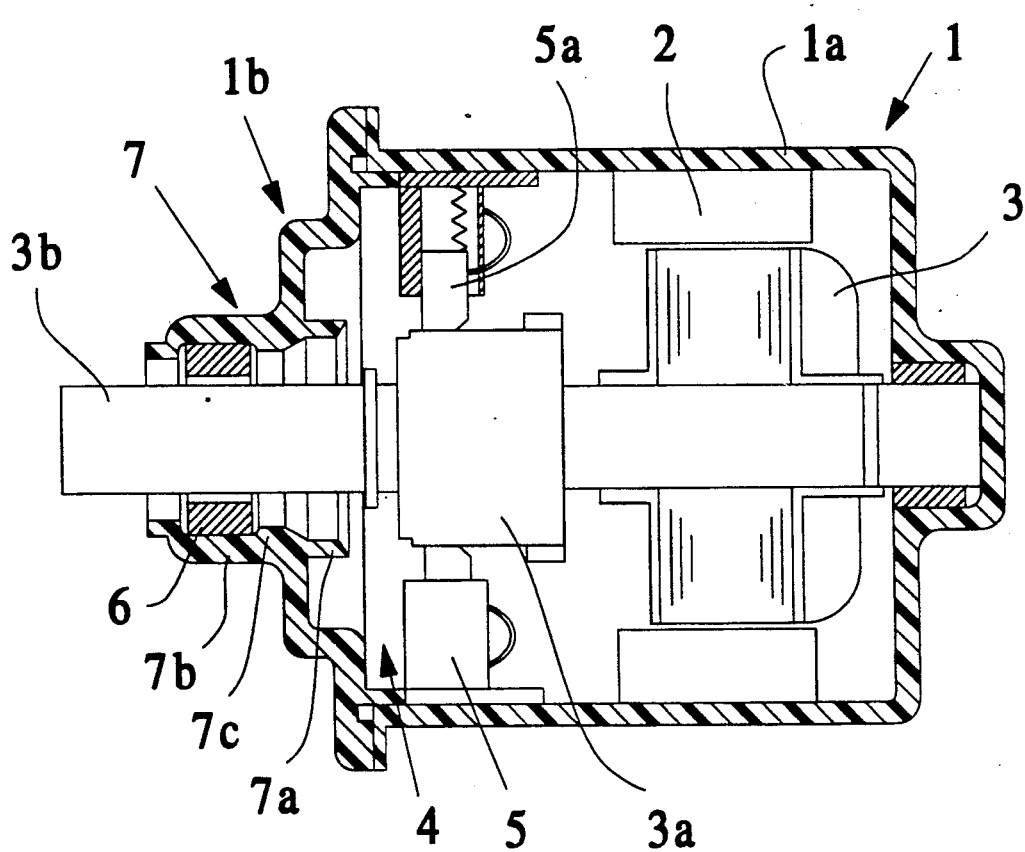
FIG. 3 is a cross-sectional view of the motor.

An embodiment of the present invention will be described in detail with reference to the accompanying drawings. In FIGS. 1 to 4, a motor casing 1 has a permanent magnet 2 fixed to the inner peripheral surface thereof. The motor casing 1 incorporates a rotor core 3. Brush holders 5, as shown in FIG. 3, are integrally formed with a brush chamber 4 formed on the inner peripheral surface of the casing 1. Brushes 5a, elastically mounted on the brush holders 5 are in slidable contact with a commutator 3a of the rotor core 3.

The motor casing 1 has a small-diameter portion, that is, an bearing seat 7, for rotatably supporting a core shaft 3b of the rotor core 3 through a bearing 6.

Figure 2A:
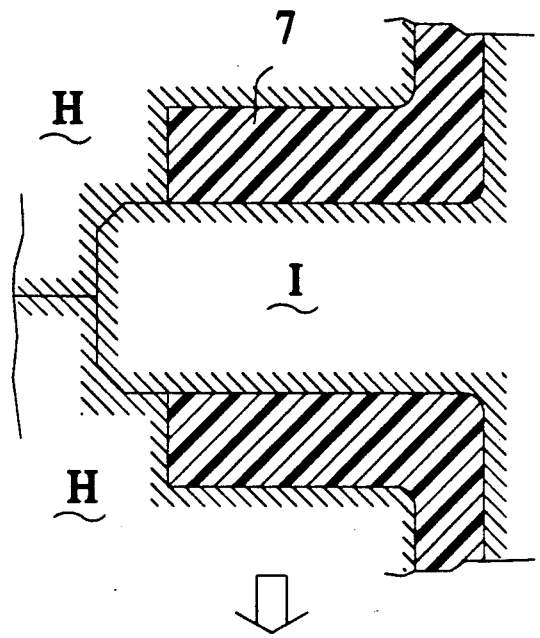
FIG. 2(a) is an enlarged cross-sectional view of the essential parts of the bearing seat portion and molds H and I.
Figure 2B:
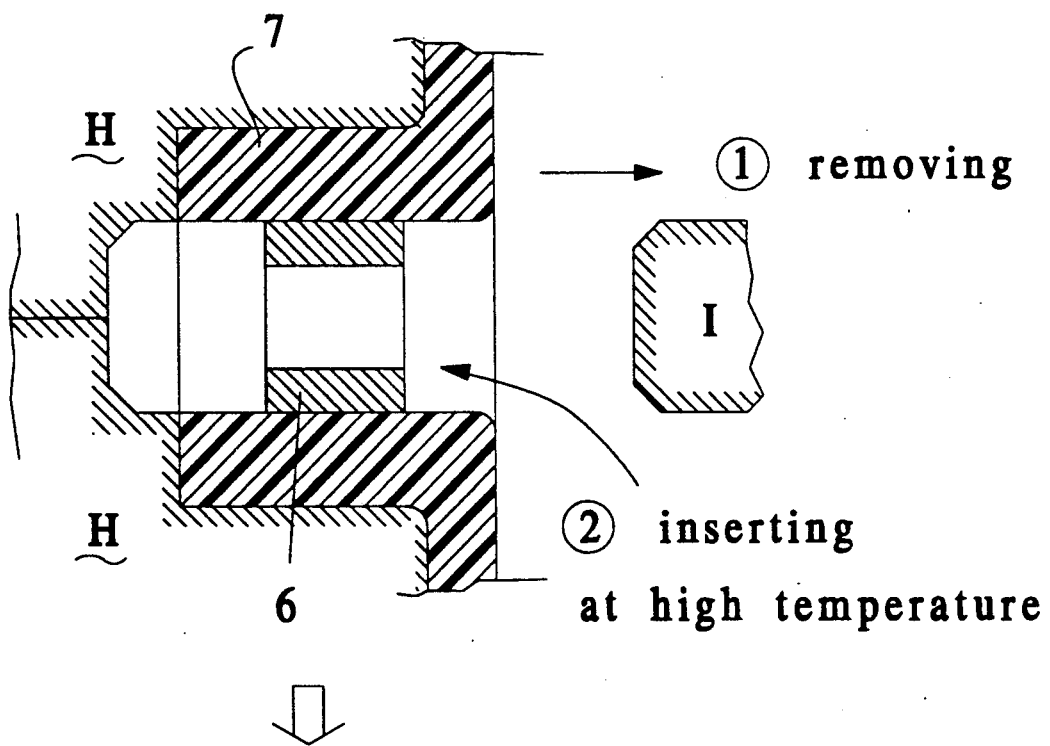
FIG. 2(b) shows the bearing when inserted into the bearing seat at a high temperature.
Figure 2C:
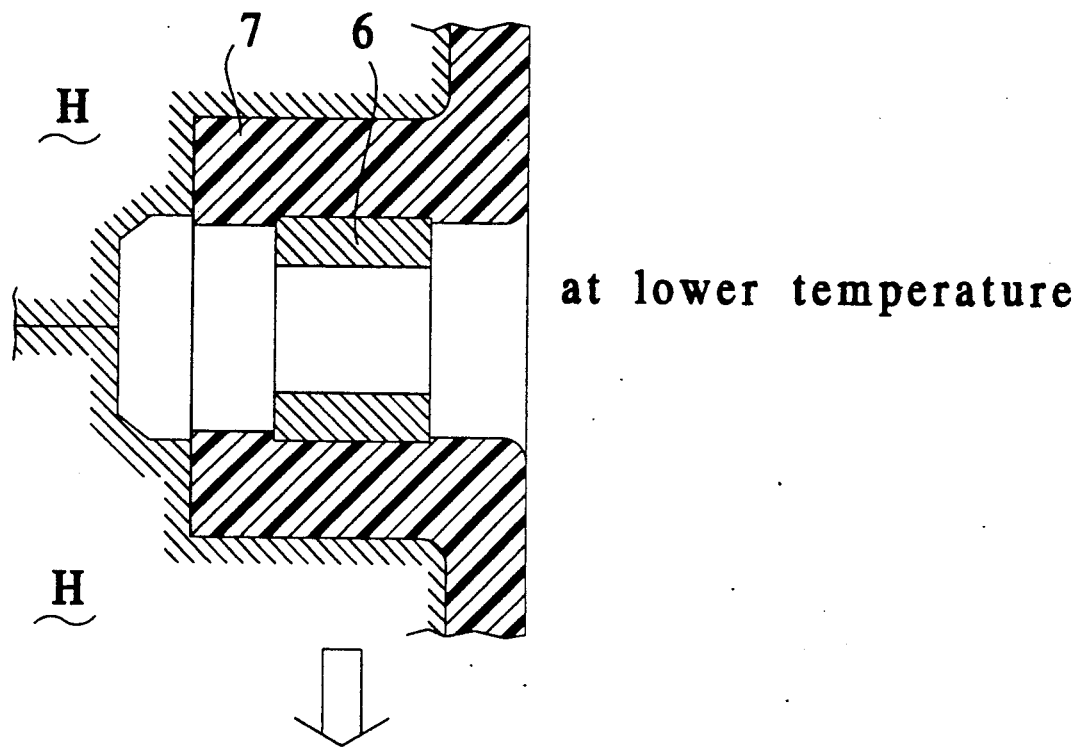
FIG. 2(c) shows the bearing inserted, and the bearing seat at a lower temperature.
Figure 2D:
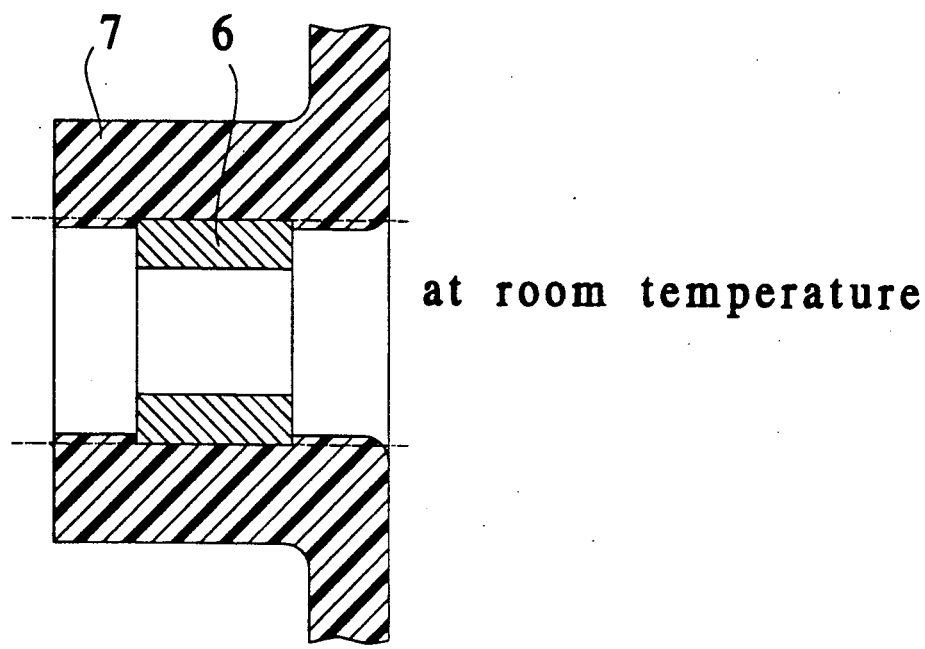
FIG. 2(d) is an enlarged cross-sectional view of the essential parts of the casing of FIG. 1 after the casing has fully cooled.
Figure 4:
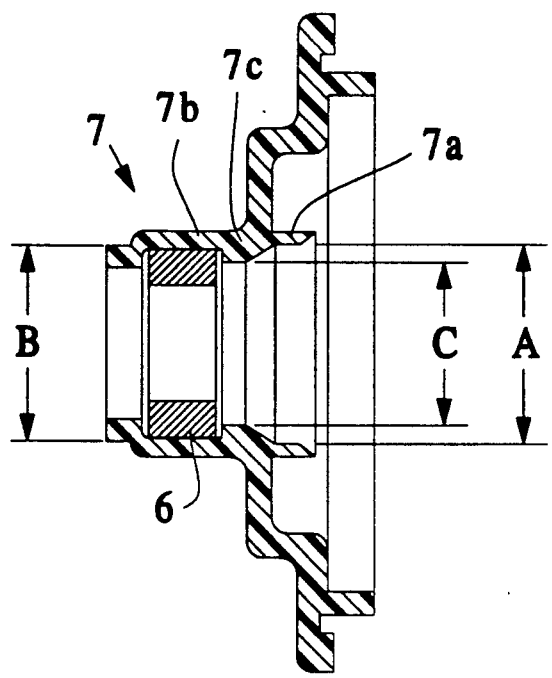
FIG. 4 is an enlarged cross-sectional view of a front frame of FIG. 3.
Figure 5:
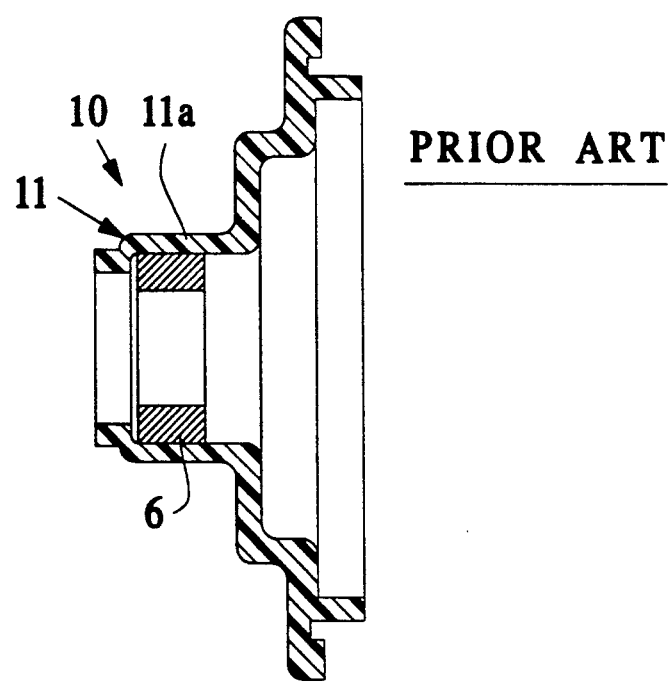
FIG. 5 is an enlarged cross-sectional view of a front frame of a conventional motor casing.

In a first embodiment, the bearing seat 7 is manufactured in the manner described below by injecting a molten thermoplastic resin, such as polyethylene terephthalate, between an outer mold H which defines the outer periphery of the bearing seat 7 and an inner mold I which defines the inner periphery thereof as shown in FIG. 2(a). First, both the molds H and I are heated to about 110° C., which is the recrystallization temperature of the resin material. At that time, adjustment of the surface temperature of the inner mold I alone may be conducted using a temperature adjusting device connected to the inner mold I. In that state, a molten resin material is injected between the two molds, and then the resin is gradually cooled. When the temperature of the inner mold I has been cooled to a value which is higher than the glass transition point of the resin and at which the resin is in an activated state and crystallization thereof is in a progress, the inner mold I alone is removed as shown in FIG. 2(b), and the bearing 6 is inserted into the bearing seat 7 before the temperature of the inner peripheral surface thereof lowers to the glass transition temperature of the resin or below as shown in FIG. 2(c). Thereafter, the bearing seat 7 is cooled to the ambient temperature to obtain the casing 1 as shown in FIG. 2(d).

In a second embodiment, the bearing seat 7 is manufactured in the manner described below. First, the casing is formed by injecting a molten thermoplastic resin, such as polyethylene terephthalate, between the outer mold H which defines the outer periphery of the bearing seat 7 and the inner mold I which defines the inner periphery thereof. After the casing 1 is removed from the molds and is cooled to the ambient temperature, it is heated to a temperature which is not less than the glass transition temperature thereof, and the bearing 6 is inserted into the bearing seat 7 which is in a heated state. Thereafter, the bearing seat 7 is cooled to the ambient temperature to obtain the casing 1.

In either of the above-described embodiments, when the bearing 6 is inserted into the bearing seat 7 during the molding of the casing 1, it is inserted before the temperature of the bearing seat 7 lowers to the glass transition temperature ($T_g$) of the resin or below. The glass transition temperature is a temperature at which crystallization of the resin is in progress but at which the resin is still in an activated state, allowing for deformation of the resin.

Consequently, in a subsequent temperature-lowering process, the bearing seat 7 gradually shrinks to the form of the inserted bearing 6. As a result, the inner peripheral surface of the bearing seat 7 is substantially completely round and is in contact with the outer peripheral surface of the bearing 6. Therefore, localized pressures acting on the bearing 6 are eliminated, and deformation of the bearing 6 is effectively prevented. This allows for mounting of the bearing with a high degree of accuracy and leads to an increase in the quality and performance of the motor.

Such a highly accurate mounting of the bearing can be accomplished without repeated correction of the shape of the mold used for molding the bearing seat 7, eliminating the need for an expensive measuring device and a sophisticated processing technique. This is a great improvement in workability.

Furthermore, the bearing seat 7 has a diameter smaller than the outer diameter of the bearing 6 at positions which face the front and rear end portions of the bearing 6 due to shrinkage of the resin material, and the inner peripheral surface of the bearing seat 7 supports the front and rear end portions of the bearing 6 in an undercut state. Consequently, shifting of the bearing 6 in an axial direction thereof is prevented, and reliability of the casing is greatly improved.

The advantages of the first embodiment will further be described below using an example. In the following example, a motor casing was actually manufactured by molding using polyethylene terephthalate having a melting point of 260° C., a recrystallization temperature of about 110° C. and the glass transition temperature of about 55°.

Figure 6:
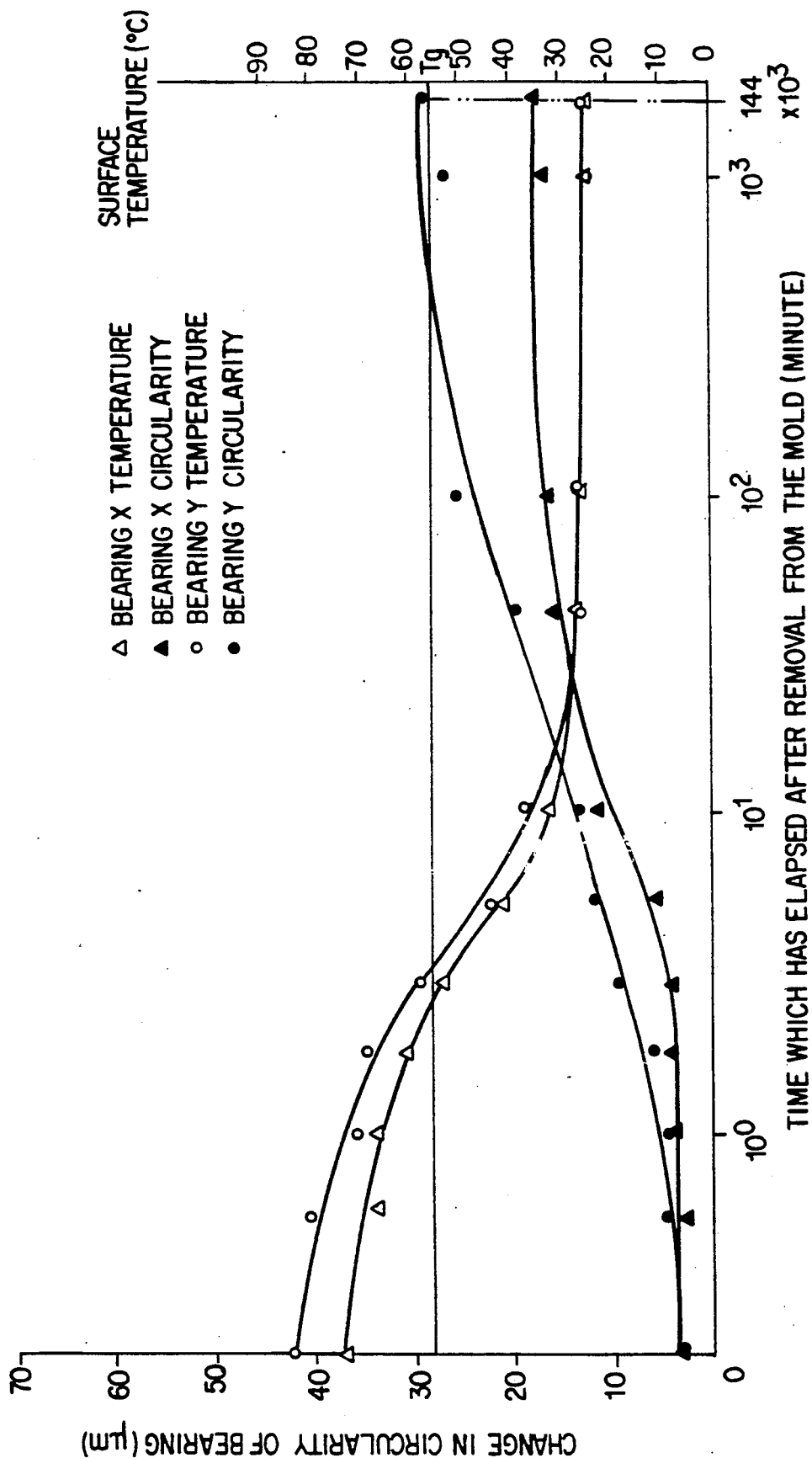
FIG. 6 is a graph in which changes in the temperature of the inner peripheral surface of a bearing seat after the molded product is removed from a mold and changes in the circularity of the inserted bearings are plotted.

In the above motor casing, bearings X and Y, respectively having outer diameters of 9 mm and 12 mm, were inserted into the bearing seat. FIG. 6 shows a graph plotting the changes in the temperature of the inner peripheral surface of the bearing seat after the molded article was removed from the mold and the changes in the circularity (the maximum deflection in the radial direction from an ideal circle), as measured twenty-four hours after the casing was removed from the mold, of the inserted bearing when inserted at a given surface temperature. On FIG. 6, the solid figures represent circularity data, while the outline figures represent temperature data. The triangle symbols represent data from the X bearing trials, while the circle figures represent the data from the Y bearing trials.

As can be seen from FIG. 6, changes in the circularity of the inserted bearing are minimized when the bearing is inserted before the surface temperature lowers substantially to the glass transition temperature. Essentially, the lower the surface temperature when the bearing is inserted, the worse the circularity of the bearing becomes. This shows how advantageous the first embodiment is.

With respect to the bearing X, it was observed that its circularity as inserted into the bearing seat, when the bearing was inserted at a temperature of approximately 25° C. (reached 1,440 minutes after the casing was removed from the mold), changed by 17.5 μm, whereas the circularity of the bearing inserted when the temperature was in the vicinity of the glass transition temperature $T_g$ changed by about 5 μm. With respect to the bearing Y, changes in the circularity decreased from 37.5 μm to 9 μm when the temperature at insertion was similarly increased. In both cases, the circularity improved by 70% or above.

Figure 7:
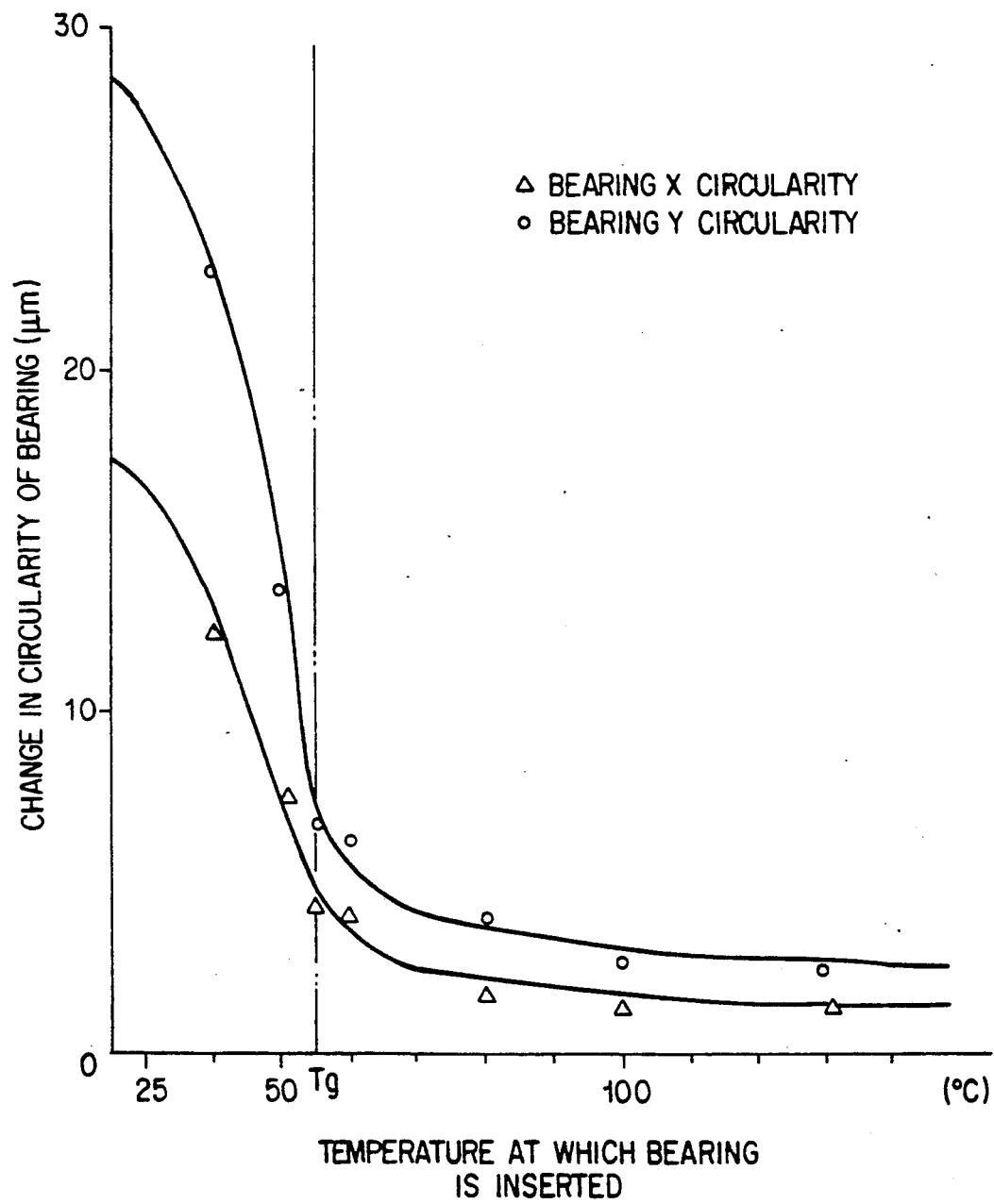
FIG. 7 is a graph in which changes in the temperature of the inner peripheral surface of a bearing seat after the molded product is removed from a mold and changes in the circularity of the inserted bearing are plotted.

Next, the advantages of the second embodiment will be described. In this example, the same bearings were used. After the manufactured casing was left at the room temperature for twenty four hours, the casing was heated to a selected temperature, and the bearing was inserted into the bearing seat having that temperature. Thereafter, the casing was left at room temperature for forty-eight hours. FIG. 7 is a graph of the temperature of the bearing seat when the bearing was inserted plotted against changes in the circularity (maximum deflection in the radial direction relative to the ideal circle) of the inserted bearing.

On FIG. 7, the triangle symbols represent data from the X bearing trials, while the circle symbols represent the data from the Y bearing trials. As can be seen from FIG. 7, when the heating temperature was higher than the glass transition temperature, a greater improvement in the circularity of the bearing was observed, as in the first embodiment.

With respect to the bearing X, it was observed that its circularity when inserted at room temperature changed by 17.5 μm, whereas the circularity of the bearing inserted near the glass transition temperature and then cooled to room temperature changed by about 6 μm. Changes in the circularity of the bearing decrease as the heating temperature increases to the recrystallization temperature, $T_g$ (approximately 55° C). A similar phenomenon was observed with respect to the bearing Y. This proves how advantageous the second embodiment is.

In the first embodiment, the mold was removed at a temperature higher than the recrystallization point, and the bearing was inserted into the bearing seat at that temperature. Forty-eight hours after the mold was removed, the circularity of the inserted bearing was measured. Great change in the circularity of the bearing was observed. As the temperature at which the bearing was inserted rises, the resin material which forms the bearing seat is softened, making insertion difficult. Particularly, at 200° C. or above, the resin material cannot maintain its original shape. Therefore, the temperature of the inner peripheral surface of the bearing seat at which the bearing is inserted should be at a level which ensures that the resin material can maintain its shape after the mold is removed. When the temperature of the inner peripheral surface is lower than the recrystallization temperature, recrystallization of the resin material which forms the inner peripheral surface of the bearing seat is in progress and the resin material is stable. As a result, deformation of the bearing seat caused by the insertion is eliminated.

In the second embodiment, the bearing was inserted in a state in which the bearing seat was heated to a temperature higher than the recrystallization temperature, as in the first embodiment. It was observed that the circularity greatly improved.

It is possible to provide a better casing using the above-described procedures. In this embodiment, the casing 1 made of a resin is divided into a yoke 1a and a front bracket 1b, and mounting of the bearing in the front bracket 1b is described. The front bracket 1b has an bearing seat 7 for rotatably supporting a rotor shaft 3b of the rotor core 3. This bearing seat rotatably supports the rotor shaft 3b through the bearing 6 and has the following inner peripheral surface. Specifically, the bearing seat 7 has a bearing inserting portion 7a which protrudes toward the brush chambers 4. The bearing inserting portion 7a has an inner diameter A which is slightly larger than the outer diameter B of the bearing 6 (A>B) so that it can temporarily hold the bearing 6 in a state in which the bearing 6 is centered. A bearing seat 7b is formed on the outer end side of the bearing inserting portion 7a. A small-diameter shift prevention portion 7c is formed between the bearing inserting portion 7a and the bearing seat 7b to prevent shifting of the inserted bearing.

Since the front bracket 1b is made of a resin, it has a coefficient of expansion very much larger than that of the metal which forms the bearing 6. Therefore, the inner diameter C of the shift prevention portion 7c is made smaller than the outer diameter B of the bearing 6 at room temperatures. Furthermore, B'>C' where B' (B<B') is the outer diameter of the expanded bearing 6 at the upper end of the operational temperature range of the motor and C' (C<C') is the inner diameter of the expanded shift prevention portion 7c.

In this embodiment, when the bearing 6 is inserted into the bearing seat 7b, it is first retained in the bearing inserting portion 7a temporarily, and then forcibly inserted into the bearing seat 7b. The inserted bearing 6 is reliably prevented from coming off by the presence of the smaller-diameter shift prevention portion 7c formed between the bearing inserting portion 7a and the bearing seat 7b.

More specifically, even when the pressure of the bearing 6 inserted in the bearing seat 7b is smaller than a required one, by the bearing 6 is prevented from shifting by the smaller-diameter shift prevention portion 7c formed at the inlet of the bearing seat 7b. Consequently, the reliability of the motor is greatly improved, and troubles caused by shifting of the bearing 6 are eliminated.

Furthermore, shifting of the bearing 6, which would occur when the motor is heated to a high temperature, is prevented. Since the inner diameter of the shift prevention portion 7c remains smaller than the outer diameter of the expanded bearing 6 at high temperatures, shifting of the bearing 6 from the bearing seat 7b is prevented at those high temperatures. This further improves reliability of the motor.

In this embodiment, when the bearing 6 is inserted into the bearing seat 7b, it passes through the narrow shift prevention portion 7c. At that time, the bearing 6 is first inserted into the bearing inserting portion 7a formed on the inlet side of the shift prevention portion 7b and temporarily held therein in a centered state before being forcibly pushed into the bearing seat 7b. Consequently, offset of the bearing 6 with respect to the small-diameter shift prevention portion 7c does not occur when it is forcibly inserted into the bearing seat 7b. In this embodiment, the adjoining portion between the bearing inserting portion 7a and the shift prevention portion 7c is tapered so as to make movement of the bearing 6 from the bearing inserting portion 7a to the shift prevention portion 7c smooth. When the bearing 6 passes through the small-diameter shift prevention portion 7c, compressive forces are applied to the shift prevention portion 7c. However, the shift prevention portion 7c is made of a resin exhibiting an elasticity. Therefore, if the compressive forces are within the elastic limitation of the shift prevention portion 7c, passage of the bearing 6 causes forcible compression of the shift prevention portion 7c but does not cause any trouble. The shift prevention portion 7c recovers its original shape after the bearing 6 has passed therethrough.

As will be understood from the foregoing description, in the present invention, the bearing is inserted into the bearing seat of the motor casing made of a thermoplastic resin while crystallization of the resin material is in progress and the resin material is thus in an activated state. Therefore, in a subsequent temperature lowering process, the bearing seat 7 gradually shrinks to the form of the bearing inserted therein. As a result, the inner peripheral surface of the bearing seat is substantially completely round and is in surface contact with the outer peripheral surface of the bearing.

Therefore, action of the localized pressure on the bearing 6 is eliminated, and deformation of the bearing 6 is effectively prevented. This allows for mounting the bearing with a high degree of accuracy and leads to an increase in the quality and performance of the motor. Such a highly accurate mounting of the bearing is accomplished without repeated correction of the shape of the mold used for molding the bearing seat and the use of an expensive measuring device and a sophisticated processing technique. This is a great improvement in workability.

Furthermore, even when the pressure of the bearing inserted into the bearing seat is looser than a set one, the bearing is prevented from shifting by the smaller diameter shift prevention portion formed on the inlet side of the bearing seat portion. Therefore, accidental shifting of the bearing from the bearing seat is avoided, and the reliability of the motor is greatly improved while trouble involving shifting of the bearing is avoided.

Furthermore, when the bearing is inserted into the bearing seat by forcibly passing it through the smaller-diameter shift prevention portion, it is temporarily held in a centered stated by the bearing inserting portion having a diameter larger than the outer diameter of the bear-ing and formed on the inlet side of the shift prevention portion. Consequently, a troublesome centering task is eliminated when the bearing is pushed into the shift prevention portion, thus greatly improving workability.

Furthermore, since the inner diameter of the shift prevention portion is made smaller than the outer diameter of the bearing at the upper limit of the operational temperature range of the motor, shifting of the bearing is prevented at high operational temperatures, despite different degrees of expansion of the bearing and the bearing seat. Therefore, the reliability of the motor casing is greatly improved even when the casing is used for a motor operated at high temperatures, such as that used in electrical equipment.

What is claimed is:

1. A method for manufacturing a motor casing having a circular bear seat portion for supporting a bearing, comprising the steps of:
    injecting a heated thermoplastic resin material into a mold thereby forming a motor casing by molding;
    inserting a bearing, the bearing rotatably supporting a core shaft of a rotor core such that an axis of the bearing is substantially parallel to an axis of the core shaft, into the bearing seat portion while a temperature of the thermoplastic resin material is below a recrystallization temperature of the thermoplastic resin material and above a glass transition temperature of the thermoplastic resin material; and
    cooling the thermoplastic resin material to room temperature to obtain a bearing seat portion that is substantially completely round.

2. The method of claim 1, wherein the thermoplastic resin material is polyethylene terephthalate and the bearing is inserted into the bearing seat portion while the temperature of the polyethylene terephthalate material is between 55° C. and 80° C.

3. The method of claim 1, further comprising the step of:
  removing the thermoplastic resin material from the mold before the step of inserting the bearing.

4. The method of claim 1, further comprising, before the step of inserting the bearing, the steps of:
  cooling the thermoplastic resin material; and
  reheating the thermoplastic resin material.

5. A method for manufacturing a motor casing having a circular bearing seat portion for supporting a bearing, comprising the steps of:
  injecting a thermoplastic resin material into a mold thereby forming a motor casing by molding;
  successively removing an inner mold section to expose the bearing seat portion and inserting a bearing, the bearing rotatably supporting a core shaft of a rotor, into the bearing seat portion such that an axis of the bearing is substantially parallel to an axis of the core shaft, while a temperature of the thermoplastic resin material is below a recrystallization temperature of the thermoplastic resin material and above a glass transition temperature of the thermoplastic resin material; and
  cooling the thermoplastic resin material to room temperature to obtain a bearing seat portion that is substantially completely round.

6. The method of claim 5, wherein the thermoplastic resin material is polyethylene terephthalate and the bearing is inserted into the bearing seat portion while the temperature of the polyethylene terephthalate material is between 55° C. and 80° C.

* * * * *